Dec. 28, 1965   G. R. PIPES   3,225,370
NUT AND INSERT ASSEMBLY MACHINE
Filed Dec. 26, 1962   8 Sheets-Sheet 1

FIG.1

INVENTOR.
GEORGE R. PIPES
BY
*Schrammy Kinner & Sturges*
ATTORNEYS.

Dec. 28, 1965  G. R. PIPES  3,225,370
NUT AND INSERT ASSEMBLY MACHINE
Filed Dec. 26, 1962  8 Sheets-Sheet 2

INVENTOR.
GEORGE R. PIPES.
BY
ATTORNEYS.

Dec. 28, 1965  G. R. PIPES  3,225,370
NUT AND INSERT ASSEMBLY MACHINE
Filed Dec. 26, 1962  8 Sheets-Sheet 3

Fig. 3

INVENTOR.
GEORGE R. PIPES
BY
ATTORNEYS.

Dec. 28, 1965     G. R. PIPES     3,225,370
NUT AND INSERT ASSEMBLY MACHINE
Filed Dec. 26, 1962     8 Sheets-Sheet 4

INVENTOR.
GEORGE R. PIPES
BY
Schramm, Keamer & Sturges
ATTORNEYS.

Dec. 28, 1965  G. R. PIPES  3,225,370
NUT AND INSERT ASSEMBLY MACHINE
Filed Dec. 26, 1962  8 Sheets-Sheet 6

INVENTOR.
GEORGE R. PIPES
BY

ATTORNEYS.

United States Patent Office 3,225,370
Patented Dec. 28, 1965

3,225,370
NUT AND INSERT ASSEMBLY MACHINE
George R. Pipes, South Euclid, Ohio, assignor to Eaton Manufacturing Company, Cleveland, Ohio, a corporation of Ohio
Filed Dec. 26, 1962, Ser. No. 246,935
10 Claims. (Cl. 10—155)

This application relates to assembling arrangements and concerns particularly arrangements for assembling fasteners and related parts such as assemblies of nuts and lock washers or nuts and plastic or resilient inserts, bolts and washers and the like.

An object of the invention is to provide a reliable high output machine for assembling one fastener part with another from separate supply bins or feeders. A more specific object is to provide such a machine for automatically accomplishing the assembly including delivery of parts to the assembly station.

Another object of the invention is to provide means for supplying fastener parts right side up.

A further object of the invention is to assemble plastic insert sleeves with nuts having annular recesses so as to form self-locking nut assemblies.

Other and further objects, features and advantages of the invention will become apparent as the description proceeds.

This application is in part a continuation of my applications 84,055, filed January 23, 1961 for Fastener and Washer Assemblies, upon which Patent No. 3,142,078 issued, and 187,435, filed April 13, 1962 for Multiple Part Fastener Assembly Machines.

In carrying out the invention in accordance with a preferred form thereof a rotatable table is provided having an inclined axis of rotation with two loading stations at different points at the periphery of the rotatable table, each loading station forming the terminus of a chute from which two different parts to be assembled are supplied. For example in the case of forming self-locking nut assemblies one part is a nut and the other part is a plastic tubular insert for the nut. The nut station is higher than the insert station and further advanced angularly with respect to the direction of rotation of the table.

The table is provided with a plurality of passage ways around its periphery or comparable guiding means for insert pickup units which are axially movable along axes parallel to the axis of rotation of the rotatable table. A lifting cam is mounted under the rotatable table in such a manner as to be engageable with the lower ends of the insert pickup units and to produce axial movement of the insert pickup units.

Each insert pickup unit has a tooling button at the upper end thereof. There is another cam for depressing the tooling button as the rotatable table is rotated, which cam terminates at the insert loading station in order to cause the tooling button to ride off the latter cam and enter an insert at the insert loading station. There is also a nut supporting plate secured at a higher level with respect to the axis of rotation of the rotating table than the insert feeding station and at a lower level than the nut loading station. In this manner rotation of the rotatable table causes the insert to travel under the nut supporting plate.

There is a nut holding blank rotatable with the rotatable table having a peripheral notch therein or plurality of peripheral notches aligned with the insert pickup units for revolving nuts from the nut loading station each in alignment with an insert. The nut supporting plate terminates at a point beyond the nut loading station. This causes a nut rotated by the nut holding blank to drop on to an insert supported by the tooling button. The insert lifting cam has a rise at an angular position beyond the termination of the nut supporting plate for pressing the insert into the nut. Fingers or deforming members are mounted around the upper end of the insert unit and provided with means for driving the fingers against the insert to compress the same into the nut for clinching the insert therein or for inwardly crimping the nut to retain the insert therein.

A better understanding of the invention will be afforded by the following detailed description considered in conjunction with the accompanying drawing in which.

Like reference characters are utilized throughout the drawing to designate like parts.

In assembling fastener parts in accordance with a preferred embodiment of the invention an automatic machine is employed for carrying out the steps of the process. The embodiment of the machine illustrated in the drawings represents means for carrying out the process applied to nuts and plastic inserts assembled therewith to form self locking nut assemblies, but the invention is not limited to the assembly of nuts and plastic inserts. The illustrated embodiment of the machine comprises a rotating table 11 mounted for rotation around a stationary hollow center post 12 and a plurality of insert pickup units 13 shown most clearly in FIGS. 1, 15, and 4, respectively.

Figure 3:
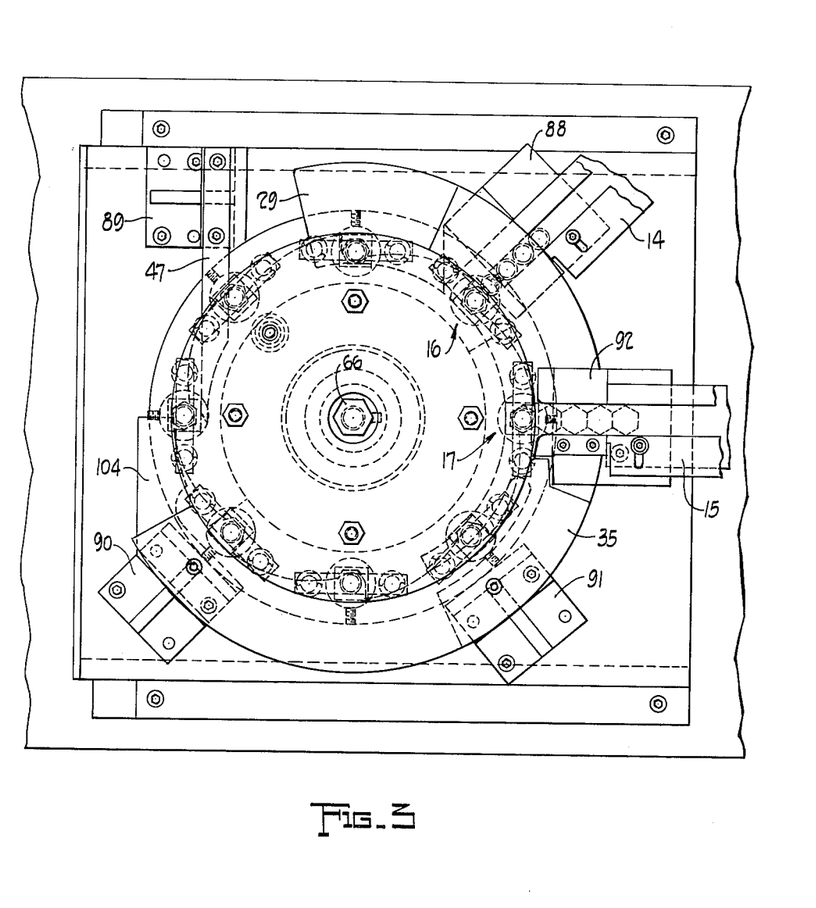
FIG. 3 is a fragmentary view of the apparatus of FIG. 1 represented as seen from above looking in the direction of the axis of rotation of the rotating parts along the arrows 3—3 indicated in FIG. 2.

Although the invention is not limited thereto the rotating table 11 preferably has an inclined axis of rotation in order to facilitate permitting gravity to carry nuts and inserts into suitable position within the rotating table 11. Chutes 14 and 15 are provided for carrying inserts and nuts respectively to an insert loading station 16 and a nut loading station 17 respectively (FIG. 3).

Figures 4, 4A, 12, 13, 14:
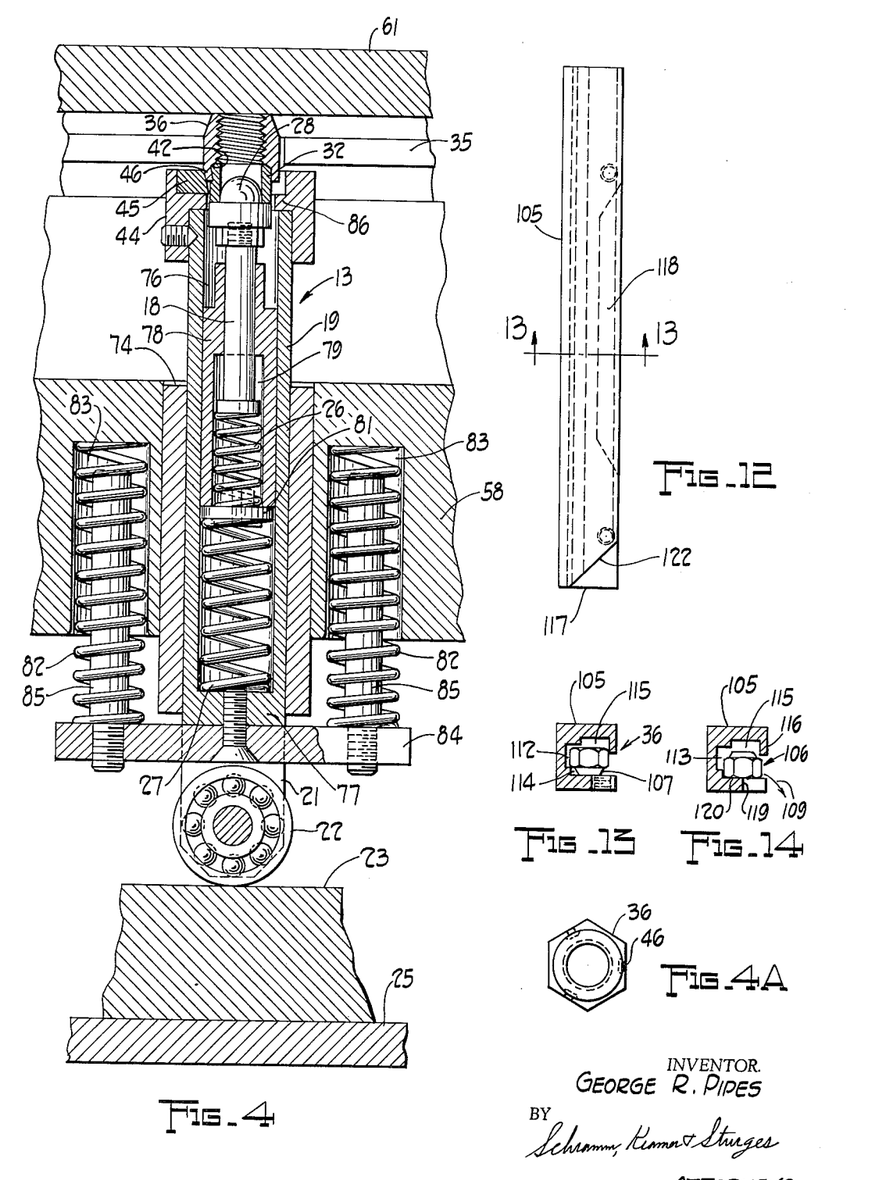
FIG. 4 is a fragmentary view in section of one of the insert pickup units represented as cut by the plane 4—4 indicated in FIG. 2 but drawn at approximately three times the scale of FIG. 2.
FIG. 4A is a plan view of one of the nuts assembled by the apparatus of FIG. 1 to the same scale as FIG. 4.
FIG. 12 is a plan view of the nut rejector block employed in the apparatus of FIG. 11, greatly enlarged with respect to FIG. 11, and at half the scale of FIGS. 4 and 4A.
FIG. 13 is a view of a cross-section of the block of FIG. 12 cut by the plane 13—13 indicated in FIG. 12.
FIG. 14 is a cross-sectional view corresponding to FIG. 13 but showing a nut which has entered in inverted position instead of upright position so as to be rejected and fall back.

Each insert pickup unit 13 comprises a shaft member 18 slidably received within a sleeve member 19. The latter is formed with a forked or clevis-like lower end 21 carrying a roller 22 serving as a cam follower for a helical cam 23 mounted in a stationary frame structure 24 upon a platform 25. Springs 26 and 27 are provided for biasing the shaft member 18 upwardly or extending the insert pickup unit 13 longitudinally, the spring 27 being the stronger. A tooling button 28 is mounted on the upper end of the extensible shaft member 18.

Figure 8:
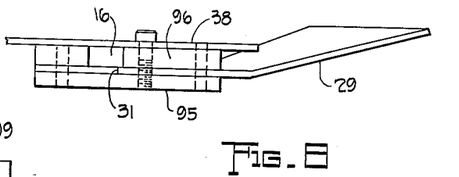
FIG. 8 is another fragmentary side view of the assembly of FIG. 5 represented as seen looking in the direction of the arrows 8—8 indicated in FIG. 5.
Figure 9:
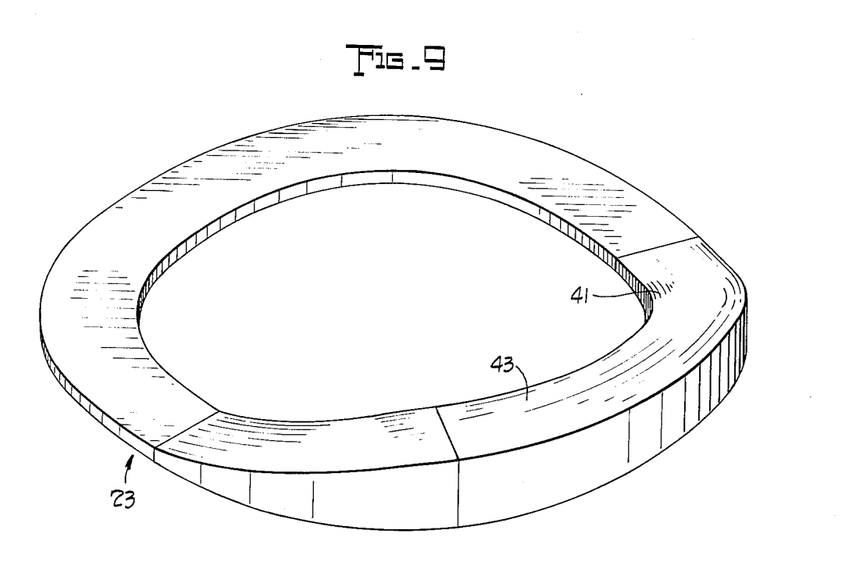
FIG. 9 is a view in perspective of a lifting cam for the insert pickup unit drawn to a much larger scale than FIG. 1.
Figure 10:
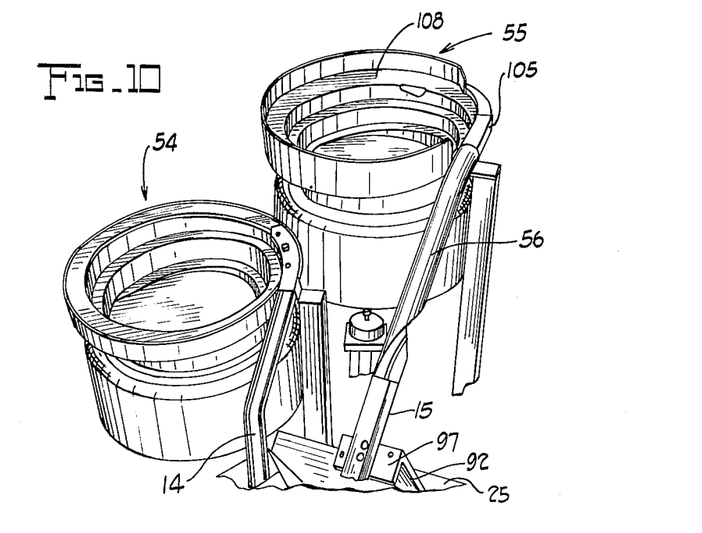
FIG. 10 is a view in perspective of a portion of the apparatus of FIG. 1 comprising centrifugal vibratory conveyors for nuts and plastic inserts, respectively, with the associated nut and insert chutes, drawn to a slightly larger scale than FIG. 1.

A cam 29 (FIGS. 2 and 5) is mounted on the supporting frame structure in a suitable position to depress the tooling button 28 and recess the shaft member 18 within the sleeve 19 against the force of the springs 26 and 27. The cam 29 terminates in the insert loading station 16 at an edge 31 (FIGS. 5 and 8) to enable the tooling button 28 to fall off the cam 29 and enter a plastic insert such as a nylon insert 32 (FIG. 4) under the force of the springs 26 and 27.

A nut-holding blank or plate 33 (FIGS. 2 and 17) having nut-holding pockets or peripheral notches 34, hexagonal in shape for hexagonal nuts, forms part of the rotating table 11. Cooperating with the nut-holding blank 33 is a nut retaining fender 35 for holding nuts 36 in the hex-pockets 34. The nut holding blank 33 is at the level of the nut loading station 17 for receiving nuts therefrom. A nut supporting plate 38 is mounted on adjacent stationary frame structure for supporting the nut 36 as it is received from the nut loading station 17. The nut supporting plate 38 terminates at an edge 39 beyond the nut loading station 17 for permitting the nut 36 to be swept off the plate 38 by the insert 32. The hex-pockets 34 in the nut holding blank 33 are so aligned with the insert pickup units 13 as to maintain the nuts and inserts in axial alignment.

The insert pickup unit lifting cam 23 is provided with a rising portion 41 high enough for compressing the spring 26 and lifting the unit 13 to hold the tooling button 28 resiliently against the cam 29 and later to cause the insert 32 to be seated on the button 28, held upward against the nut-supporting plate 38 with subsequent rotation and further movement of the button 28 and insert 32 beyond the edge 39 of the nut supporting plate 38 causing the insert 32 to be seated properly in the nut 36 which is provided with an annular recess 42 on the under surface for receiving the insert 32.

Beyond the rising portion 41 of the cam 23 is a still higher portion 43 for causing both the spring members 26 and 27 to be compressed and to move the sleeve member 19 with greater force with the upper end of the sleeve 19 surrounding the button 28. A hollow cylinder 44 is mounted on the outside edge of the sleeve 19 carrying three slant-edged finger members or indenting tools 45 mounted equally spaced 120° apart for contacting the nut 36 and indenting the outer edges thereof sufficiently to crimp the outer walls of the nut and form projections compressed into the insert 32 for clinching it in the nut 36 or deform the insert sufficiently to be retained in the nut.

Beyond the angular position of the cam 23 at which the foregoing crimping operation takes place a kick out feeler 47 is provided (FIG. 3).

Figure 1:
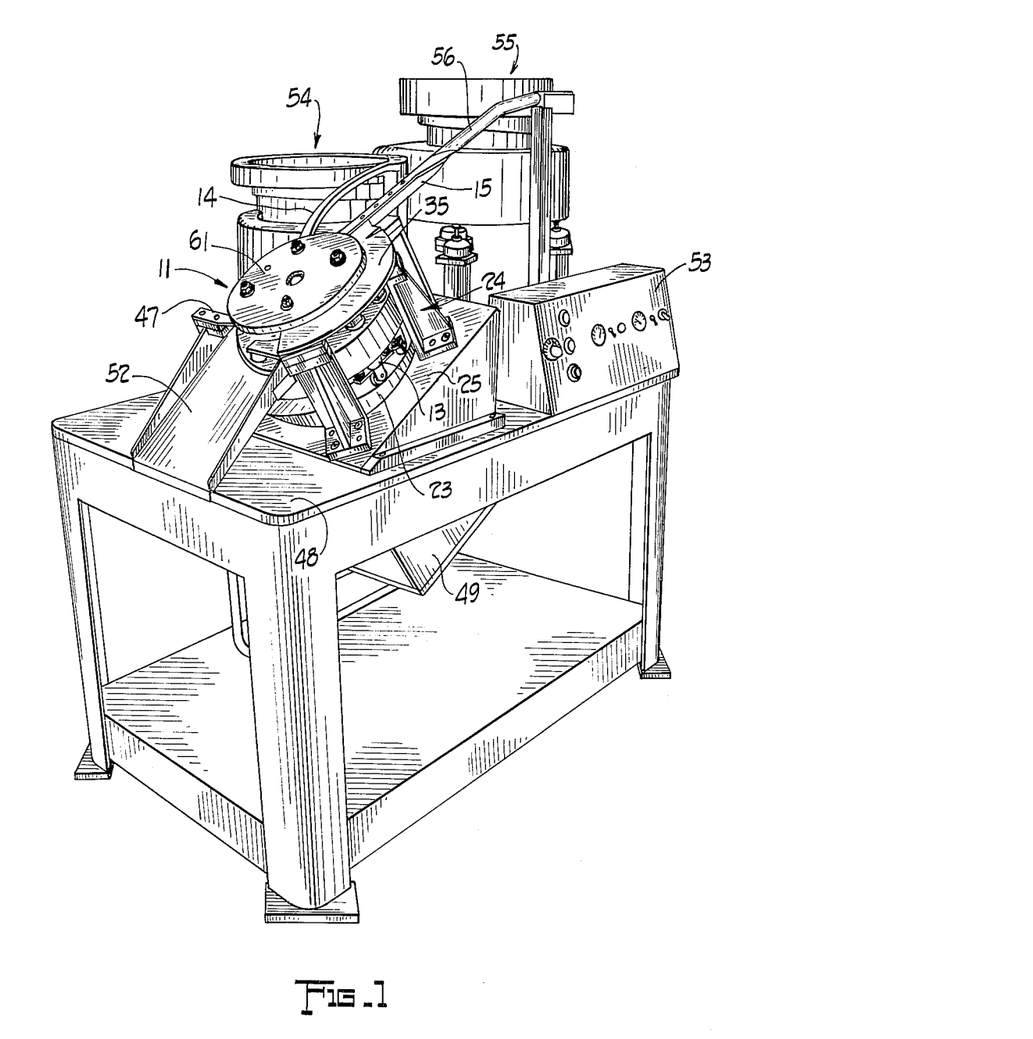
FIG. 1 is a perspective view of a machine constituting an embodiment of the invention.

Considering the structural features of the machine more in detail it will be seen from FIG. 1 that the rotating table 11 and the insert pickup unit lifting cam 23 are mounted upon the tilted platform 25 forming the top of a motor housing 49 mounted in a recess 51 in a table 48. There is a discharge chute 52 for delivering assembled parts to bins or conveyors (not shown).

Mounted upon the table 48 also are a suitable motor control panel 53 and a pair of vibratory bowl feeders 54 and 55 serving as temporary bins for plastic inserts 32 and nuts 36, respectively, which are delivered by the bowl feeders 54 and 55 to the upper ends of the insert chute 14 and the nut chute 15 respectively. For reasons which will be explained hereinafter the nuts are delivered in inverted position and an inverting section 56 is provided in the nut chute 15. The vibratory bowl feeders 54 and 55 do not constitute a part of the present invention and may be of conventional type such as that described for example in Patent No. 3,023,738 issued to Warren C. Burgess, Jr., on March 6, 1962.

Figure 2:
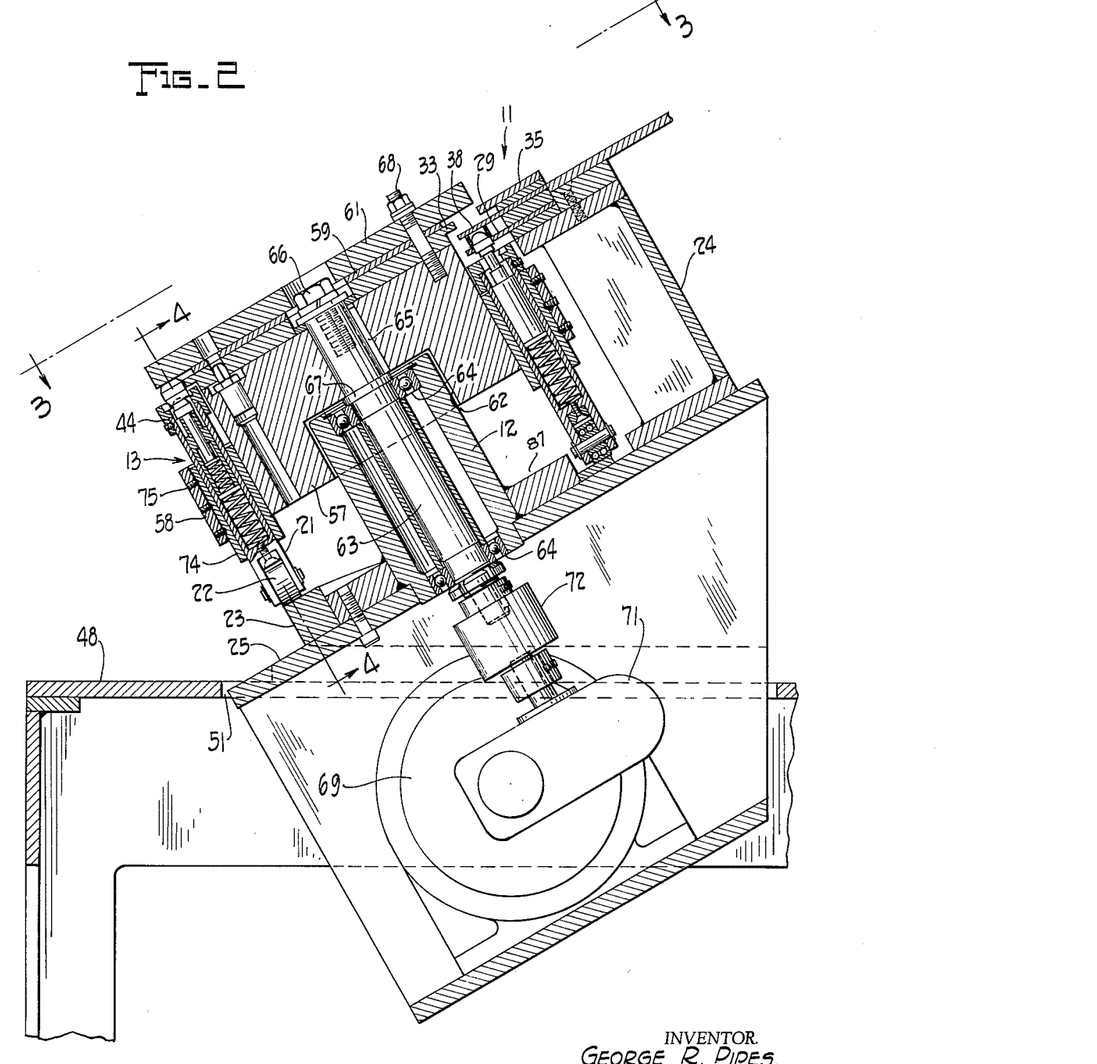
FIG. 2 is a view of a section of the apparatus of FIG. 1 represented as cut by a vertical plane passing through the axis of rotation of the rotating parts thereof.

As shown more clearly in FIG. 2 the rotating table 11 comprises a cylindrical block 57 upon which an annular skirt 58 has been shrunk or otherwise secured, the nut holding blank 33, a spacing disk 59, and a pancake-shaped top limit plate 61 together with the insert pickup units 13.

The block 51 is preferably recessed at 62 to permit rotatable mounting around the hollow stationary center post 12. To this end a rotatable shaft 63 is journaled within the post 12 by suitable means such as ball bearings 64. The upper end of the shaft 63 is secured with respect to angular and longitudinal motion to the block 57 by suitable means such as a key 65 and a cap screw 66, for example, the shaft 63 having a shoulder 67 upon which the recessed cylindrical block 57 rests. As shown, the nut holding blank 33, the spacing disk 59 and the top limit plate 61 are secured to the cylindrical block 57 by a suitable means such as lag screws 68.

The lower end of the shaft 63 is secured to driving means such as an electric motor 69, preferably through a speed reduction gear box 71 and a coupling 72.

In order that the insert pickup units 13 may be mounted in the rotating table 11 with freedom of axial movement parallel to the axis of rotation of the shaft 63 and the table 11 but prevent rotation thereof, suitable runways or guideways such as square sockets 73 are formed in the skirt portion 58 of the rotating table 11. Preferably, suitable liners 74 composed of suitable low friction materials such as bearing bronze for example are provided which are secured in the sockets 73 by a suitable means such as set screws 75.

The sleeve members 19 are of square external cross-section to make a slide fit in the liners 74. As better shown in FIG. 4 the sleeve members 19 are formed with sockets 76 which may be of circular cross-section. The sockets 76 have closed bottoms 77 upon which the springs 27 rest. For guiding the shaft members 18 coaxially in the sockets 76 hollow plungers 78 are provided with coaxial sockets 79 for the springs 26. A disk 81 is interposed between the upper end of the spring 27 and the lower end of the plunger 78 so that the force of the spring 27 must be overcome to produce inward movement of the plunger 78 toward the bottom 77 of the socket 76 and to produce inward movement of the tooling button 28 beyond the position at which it strikes the upper end of the plunger 78. It will be understood that the spring 26 is weaker than the spring 27.

Compression springs 82 are provided for restoring the sleeve member 19 to the downward position after the roller 22 has passed over the high rise portion 43 of the cam 23. In the arrangement illustrated the springs 82 are received in sockets 83 formed in the annular block 58 and the rest upon cross bars 84 secured to the portion 77 of the sleeve members 19. Guide pins 85 may be provided for springs 82. It will be observed that the hollow cylinders 44 holding the deforming tools 45 are provided with shoulders 86 which rest upon the upper end of the sleeve member 19 so that the upward movement of the roller 22 as it passes over the highest portion 43 of the cam 23 forces the deforming tools 45 into the sides of the nut 36.

Figure 15:
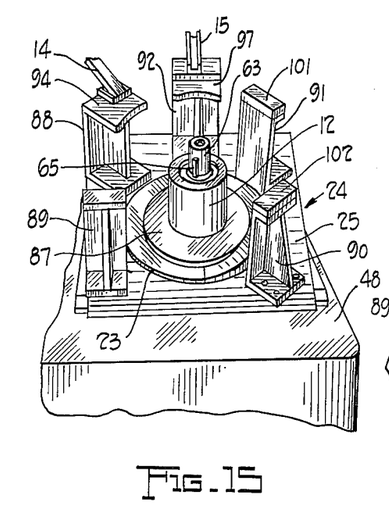
FIG. 15 is a perspective view of a supporting frame for the turn table of the apparatus of FIG. 1 showing certain supporting brackets and showing the lifting cam for the insert pickup unit but other parts removed at slightly larger scale than in FIG. 1.
Figure 16:
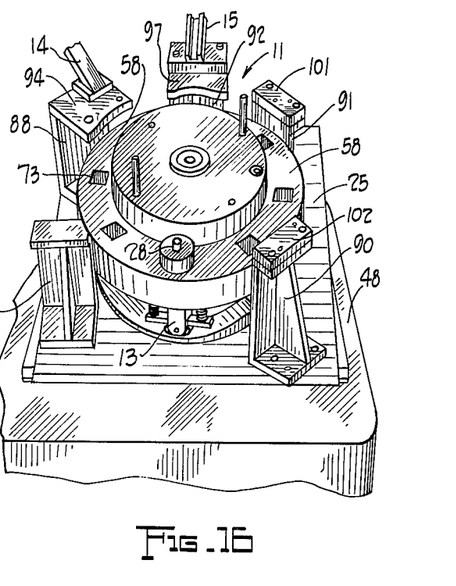
FIG. 16 is a view corresponding to FIG. 15 with the rotating table and one of the insert pickup units in place.
Figure 17:
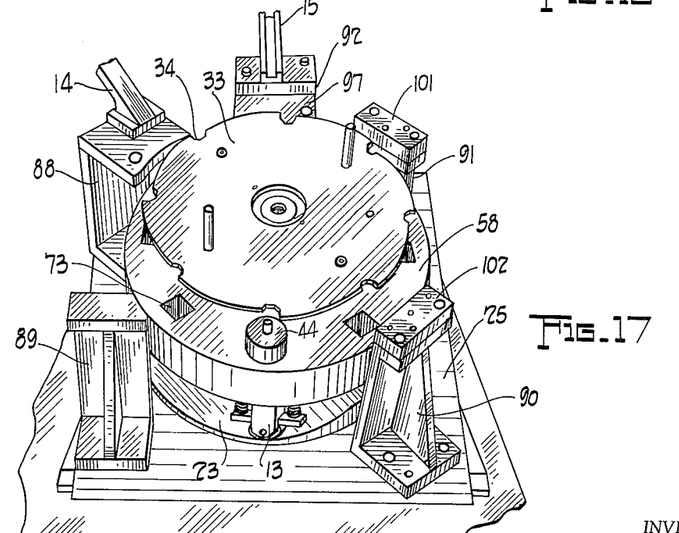
FIG. 17 is a view corresponding to FIG. 16 with the nut blank holding plate also in place but at a larger scale than FIGS. 15 and 16.

The assembly of the rotatable table 11 and the stationary frame structure 24 for the mechanism cooperating with the rotating table is illustrated in FIGS. 15, 16 and 17 as well as FIG. 2. The cam 23 as well as the base 87 for the stationary center post 12 rests upon the tilted platform 25 and the rotating shaft 63 for the rotatable table 11 extends upward through the hollow center post 12. The tilted platform 25 also carries brackets 88, 89, 90, 91, and 92 constituting part of the supporting frame work 24 for supporting other stationary parts of the apparatus. The lower end of the insert chute 14 is supported by the bracket 88, and the lower end of the nut chute 15 is supported by the bracket 92. The portion 94 of the upper face of the bracket 88 supports a spacing block 95 (FIG. 8) to which the button depressing cam 29 is bolted and upon which in turn rests a second spacing block 96 to which the nut supporting plate 38 is bolted.

Figure 7:
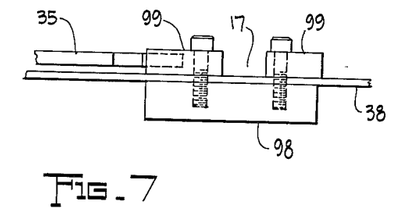
FIG. 7 is a fragmentary side view of the assembly of FIG. 5 seen as looking in the direction of the arrows 7—7 indicated in FIG. 5.

The upper face 97 of the bracket 92 supports a block 98 to which the nut supporting plate 38 is bolted. Blocks 99 resting upon the nut supporting plate 38 (FIGS. 5 and 7) serve as continuations of the nut chute 15.

Figure 5:
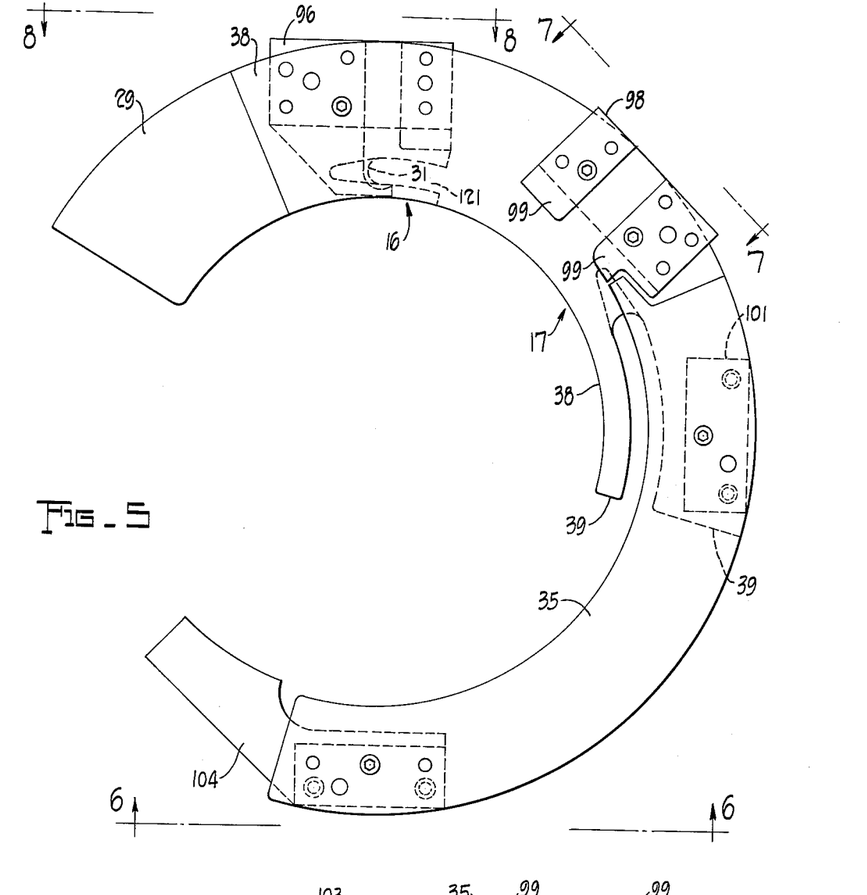
FIG. 5 is a fragmentary view showing relationship, as mounted, between a cam for limiting upward movement of the insert pickup unit to permit compression of the insert into the nut, the nut supporting plate, a nut retaining fender and related structure drawn at approximately one and one-half times the scale of FIG. 2.
Figure 6:
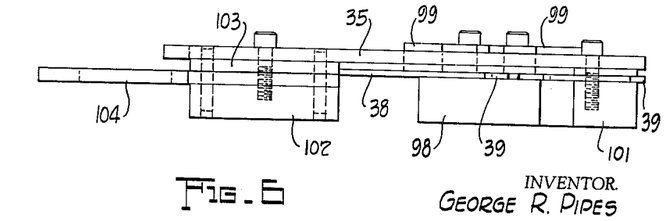
FIG. 6 is a side view of the assembly of FIG. 5 looking in the direction of arrows 6—6 indicated in FIG. 5.

The bracket 91 supports a spacer block 101 to which the nut supporting plate 38 is bolted and to which one end of the nut retaining fender 35 is bolted (FIGS. 5 and 6). The bracket 90 supports a spacing block 102 to which the other end of the nut retaining fender 35 is bolted over a spacer strip 103 and the end of a nut assembly ride-off plate 104. The kick out feeler 47 is bolted to the bracket 89.

Figure 11:
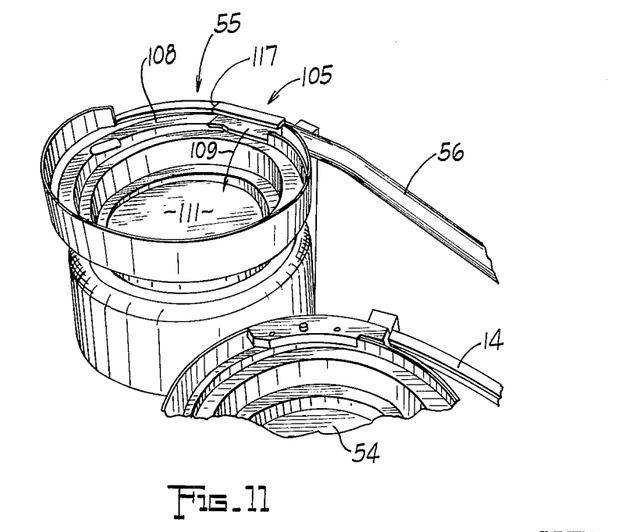
FIG. 11 is a fragmentary view of the apparatus of FIG. 10 as seen from a direction more clearly showing the rejection block at the head of the nut chute for causing the nuts to drop back unless presented to the chute with the correct end up.

As shown in FIGS. 11 and 12 a nut guide or grooved block 105 is provided for the vibratory bowl feeder 55 for rejecting nuts which would otherwise enter the nut guide 56 with the wrong side up. As shown in FIGS. 13 and 14 the nuts 36 are in the form having a main hexagonal part 106 and a conical part 107. Since the annular recess 42 is in the hexagonal part it is necessary that the nut be presented to the nut loading station 17 with the proper side up in order that the insert 32 can be automatically pressed into the recess 42 by the mechanism already described.

Accordingly, the arrangement is such that the nuts slide down the nut guide 15 with the conical part 107 up and enter the nut invertor 56 with the conical side down. The member 105 is so constructed that if the nut is delivered to the outer circular platform 108 of the vibratory bowl feeder 55 with the proper end up that is with the hexagonal part 106 up and the conical part 107 down it will enter the grooved block 105 and continue on into the nut inverting guide 56. On the other hand if the nut happens to land on the platform 108 upside down with the conical part up and the hexagonal part 106 down it will drop out of the grooved block 105 along the direction of the arrow 109 and fall back into the bottom 111 of the vibratory bowl feeder 55.

The block 105 is formed with a lengthwise groove 112 of appropriate shape to permit the nut 36 to slide along perpendicular to its central axis and longitudinally of the groove 112 in the block 105. As shown in FIGS. 13 and 14 the groove 112 has a central wide part 113 fitting the hexagonal part 106 of the nut 36. It has a somewhat narrower part 114 fitting the conical part 107 of the nut 36 when the nut 36 is upright with the hexagonal part up as shown in FIG. 13. There is another narrower part 115 in the groove 112 above the part 113. The part 115 provides space for the conical part 107 of the nut 36 and allows freedom of movement of the nut 36 along the groove 112 if the nut is presented upside down with the conical part 107 up.

The part 115 of the groove 112 has an overhanging lip 116 against which the hexagonal nut part 106 fits loosely for guidance when the nut is presented in the position shown in FIG. 13, and which laterally guides the nut 36 by the conical part 107 when the nut 36 first enters the entry end 117 of the block 105. However the central portion 118 of the block 105 has the lower edge 119 cut away, so that the shelf 120 under the portion 114 of the groove 112 in the block 105 is narrower and permits the nut 36 to drop over the edge 119 in the direction of the arrow 109 as illustrated in FIG. 14. The location of the overhang 116 is such that the conical part 107 of the nut 36 clears the overhang 116 as soon as the nut 36 reaches the cut away portion 118 of the block 105 and permits the nut 36 to tip over the edge 119 and drop down along the direction of the arrow 109. To facilitate entry of the nut 36 into the groove 112 from the platform 108, the portion of the entry end 117 of the block 105 above the groove portion 114 is cut-off along the diagonal plane 122.

In order to start the operation of the machine, inserts are supplied to the vibratory bowl feeder 54 and nuts are supplied to the vibratory bowl feeder 55, the power is turned on and the operation of the feeder causes inserts to move to the outer periphery of the feeder 54 entering the insert chute 14 down which they slide by the force of gravity. Likewise nuts approach the outer periphery and are deposited upon the platform 108 of the vibratory bowl feeder 55. These nuts then enter the block 105. Those nuts which are properly presented enter the nut inverting guide 56 and the nut guide 15. The improperly presented nuts fall back into the center part 111 of the vibratory bowl feeder 55 where they again commence their approach to the outer platform 108 for another try.

At the lower end of the insert chute 14 and the nut chute 15 an insert 32 is presented at the insert loading station 16 and a nut 36 is presented at the nut loading station 17. As the table 11 rotates, the tooling button 28 of the insert pickup unit 13 rides under the cam 29. As it reaches the insert loading station 16 it enters an insert at the loading station and carries it on toward the nut loading station. Meanwhile the next insert in the insert chute 14 drops into the insert loading station 16 in position to be picked up by the next tooling button 28 as the table 11 rotates. Since the spring 26 is weaker than the spring 27 of the insert pickup unit 13 the spring 26 is compressed readily permitting the tooling button 28 to ride under the cam 29 and to enter an insert 32 lightly as it reaches the insert loading station 16.

The cam 29 is formed with an end slot 121, the center of which terminates at the edge 31 at the insert loading staiton 16 so that the tooling button 28 is free to move upward sufficiently to enter an insert 32 located in the insert loading station 16. The presence of the under surface of the nut supporting plate 38 prevents the insert 32 from rising any higher. As the insert pickup unit 13, in revolving with the table 11, reaches the nut loading station 17 it continues to remain under the nut supporting plate 38 as a nut 36, pushed into one of the nut pockets 34, by gravity is picked up by the nut holding blank 33 and travels forward above the nut supporting plate 38 in alignment with the insert 32 which has already been picked up as explained. (As shown in FIG. 3 the lowermost nut in the chute 15 rides in along the edge of the nut holding blank 33.)

Then as the insert pickup unit 13 is question reaches the angular position represented by the end 39 of the nut support plate 38 shown in FIG. 5 the nut drops down onto the insert. The top limit plate 61 prevents the springs 26 and 27 in the insert pickup unit 13 from lifting the nut 36 as the nut and insert revolve along together under the top limit plate 61. The nut fender 35, it will be understood, has maintained the nut in a suitable position.

The next action that takes place is that the roller 22 approaches an upward sloping portion of the cam 23 such that the upper edge of the plunger 78 in the insert pickup unit 13 strikes the lower portion of the tooling button unit 28 so that the button 28 is subjected to the greater force of the stronger spring 27 which serves to drive the insert 32 into the recess 42 in the nut 36 (referring particularly to FIG. 4). Thereupon the roller 22 reaches the portion 43 of the cam 23 which rises still further. This causes the hollow cylinder 44 to rise up to the position shown in FIG. 4 driving the indenting tools 45 against the outer edges of the nut 36 and producing the crimps 46, which also indents the plastic insert 32 or deforms it so as to retain it permanently within the nut 36.

As the table 11 rotates further the cam 23 falls again permitting the insert pickup unit 13 to drop and likewise permitting the sleeve member 19 to drop, the strong springs 82 serving to insure the lowering of the sleeve member 13. Accordingly, the springs 27 and 26 are free to drive the tooling button 28 upward with respect to the sleeve member 19 and to move the nut 36 out of the cylinder 44 and out of contact with the crimping or deforming tools 45. The sleeve member 19 by this time has been lowered so far that the nut 36 is clear of the top limit plate 61 and falls upon the ride-off plate 104 and into the discharge chute 52. If by chance the nut and insert assembly is not separated from the rotatable table beforehand, by the time it reaches the position of the kick out feeler 47, it is stripped from the machine and caused to fall upon the discharge chute 52.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention.

It is, therefore, particularly pointed out and distinctly claimed as the invention:

1. Apparatus for assembling nuts and inserts comprising in combination a supporting frame, a rotatable table having an inclined axis of rotation, an insert loading station at the edge of the rotatable table, an insert chute terminating at the insert loading station, a nut loading station at the edge of the rotatable table, a nut chute terminating at the nut loading station, the nut station being higher than the insert station, and being further advanced angularly with respect to the direction of rotation of the table, the rotatable table having an insert pickup unit axially movable parallel to the axis of rotation of the table, a lifting cam mounted on said supporting frame engageable by the lower end of said insert pickup unit as the rotatable table rotates, to produce axial movement of said insert pickup unit, said insert pickup unit having a tooling button at the upper end thereof, spring means for resiliently biassing the tooling button upwards, a cam for depressing the tooling button as the rotatable table is rotated, said latter cam terminating at the insert loading station, whereby the tooling button rides off said cam and is inserted into an insert at the insert loading station, a nut supporting plate secured to the supporting frame at a higher level with respect to the axis of rotation of the rotating table than the insert loading station and on a lower level than the nut feeding station, whereby rotation of the rotatable table causes the insert to travel under the nut supporting plate, a nut holding blank rotatable with the rotatable table having a peripheral notch therein aligned with the insert pickup unit for carrying a nut from the nut loading station in alignment with an insert, said nut supporting plate terminating at a point beyond the nut loading station, thereby causing a nut carried by the nut holding blank to drop on to an insert supported by the tooling button, the insert lifting cam having a rise at an angular position beyond the termination of the nut supporting plate for pressing the insert into the nut, a top limit plate mounted on said rotatable table extending radially beyond the insert pickup unit for limiting upward motion of the nut during movement of the insert into the nut, finger members mounted around the upper end of the insert pickup unit and means for driving the finger members against side surfaces of the nut to indent the same while the insert is pressed into the nut for clinching the insert in the nut.

2. Apparatus for assembling first and second parts comprising in combination first and second part loading stations, means for carrying a first part from the first part loading station to the second part loading station and beyond, means for carrying a second part from the second part loading station above the first part, means for thereafter axially moving the first part with respect to the second part and means for indenting one of the parts transversely to secure it to the other, said indenting means comprising a pair of relatively movable elements, one of which carries said means for axially moving the first part with respect to the second and being coaxial therewith.

3. Apparatus for assembling first and second parts, each having a center axis and the parts being coaxially engageable, said apparatus comprising a part loading station, means having an axis of rotation for carrying the first part through said part loading station along an arcuate path with its center axis parallel to said axis of rotation, means for delivering the second part to said loading station with its center axis in alignment with the center axis of the first part and parallel to said axis of rotation, means for releasing one of said parts at the part loading station in juxtaposition to the other, means for imparting axial movement to one of said parts for inserting one part in the other and assembling them, and means for thereafter transversely deforming one of the parts to secure it to the other, said deforming means comprising a pair of relatively movable elements, one of which carries said means for axially moving the first part with respect to the second and being coaxial therewith, one of said relatively axially movable elements of the deforming means carrying a deforming tool having an edge oblique with respect to the axis of said relatively movable elements and the axis of said part, and a limit plate for limiting axial movement of the part to be deformed while the other part is inserted therein and while said deforming tool is moved axially into engagement with said part to be deformed.

4. Apparatus for assembling first and second parts having center axes and being adapted for coaxial engagement with each other, said apparatus comprising means for carrying a first part transverse to its axis along an arcuate path to a position in axial alignment with the second part, means for supporting the second part with its axis aligned to the axis of the first part during subsequent travel of the first part, means for releasing the second part in juxtaposition with the first, means for thereafter imparting axial movement to one of the parts to insert it into the second, means for carrying the assembled pairs of parts along an arcuate path to a discharge point, means disposed on said path for transversely deforming one part securing it to the other, and a limit plate, said deforming means comprising first and second elements relatively movable axially with an axis common to the axis of movement of said axially moved part, the first relatively axially movable element of the deforming means carrying said means for axially moving the axially moved part and the second element of said deforming means carrying a deforming tool having an edge which is oblique with respect to the axis of movement of said second element of the deforming means and is adapted to engage an edge of the part which is not axially moved, said limit plate being so positioned as to stop movement of the other part when the first part is inserted therein and when the indenting tool engages said part.

5. A lock nut assembly machine comprising in combination an insert loading station, a nut loading station, a rotatable table having an axis of rotation substantially equidistant from the loading stations, an insert pickup unit mounted for axial movement on the table parallel to the axis of rotation of the table, said pickup unit having a tooling button at one end thereof and a cam follower at the opposite end thereof, means for depressing the tooling button up to the insert loading station to permit the button to engage an insert at the insert loading station, the nut loading station being along a plane axially above the insert loading station, a nut support plate interposed between the planes of the nut loading station and the insert loading station, said support plate terminating at a point beyond the nut loading station angularly for permitting a nut to fall upon the insert, means for carrying a nut from a nut loading station in axial alignment with the insert on the tooling button, a cam for coaction with said cam follower having a rising portion for engaging the insert with the nut after they have gone beyond the angular position of the terminating end of the nut support plate, means for retracting the tooling button for releasing the assembled nut and insert, a hollow cylinder mounted for axial movement coaxially with the insert pickup unit and a plurality of radially inwardly extending deforming tools carried by said hollow cylinder, the cam having a rising portion for lifting said deforming tools against the nut after the nut and insert have been assembled for securing the insert in the nut prior to retraction of the tooling button.

6. Apparatus for assembling tubular inserts with nuts having annular recesses therein which comprises an insert loading station, an insert chute with an end located at said loading station for presenting inserts one at a time to the station with the axis in a predetermined line, a nut loading station located on a plane displaced from the plane perpendicular to the axis of the insert in the insert loading station, means for presenting a nut to the nut loading station with the recess thereof extending in the direction toward the plane of the insert loading station, a rotating table having an axis of rotation parallel to the axes of the insert and the nut at the insert and nut loading stations and equidistant therefrom, said table having engaging means traveling in an arcuate path from one loading station toward the next, spring biased means for producing axial movement of such engaging means for picking up one of the pair of parts, consisting of a nut and an insert, at one loading station and carrying it to and beyond the next loading station, a cam plate along the path of the spring biased means for restraining its axial movement, said cam plate terminating at said one loading station, whereby the engaging means is released at said one loading station to effect such picking up of said one of the pair of parts, a second engaging means for engaging the other part at the second loading station and thereby causing continued movement of a nut and a sleeve in separate planes, axially aligned, around the axis of rotation of the table, an arcuate plate terminating beyond the second loading station, for holding the said other part away from said first part until the parts reach the terminating point of the arcuate plate and cam means for driving one part toward the other to locate the insert in the recess of the nut.

7. Apparatus as in claim 6 including mechanism for crimping the walls of the nut around the recess to secure the sleeve therein.

8. A lock nut assembling machine comprising in combination an insert loading station, a nut loading station, a rotatable table having an axis of rotation substantially equidistant from the loading stations, an insert pickup unit mounted for axial movement on the table parallel to the axis of rotation of the table, said pickup unit having a tooling button at one end thereof and a cam follower at the opposite end thereof, means for depressing the tooling button up to the insert loading station to permit the button to engage an insert at the insert loading station, the nut loading station being along a plane axially above the insert loading station, a nut support plate interposed between the planes of the nut loading station and the insert loading station, said support plate terminating at a point beyond the nut loading station angularly for permitting a nut to fall upon the insert, means for carrying a nut from a nut loading station in axial alignment with the insert on the tooling button, a cam for coaction with said cam follower having a rising portion for engaging the insert with the nut after they have gone beyond the angular position of the terminating end of the nut support plate, and means for retracting the tooling button for releasing the assembled nut and insert.

9. In a fastener assembly machine a fastener part pickup unit comprising in combination an axially movable sleeve member, a shaft member axially movable therein, the sleeve member having radially inwardly extending indenting tools therein, a cam follower secured to one end of the sleeve member, the shaft member being adapted to extend from the other end of the sleeve member with means for resiliently extending said shaft member, and a tooling button mounted at the end of the shaft member.

10. Apparatus as in claim 9 wherein the tooling button is adapted to support a fastener part, a top limit plate is mounted in a fixed position beyond the tooling button, and the indenting tools are mounted at the end of the sleeve member toward the tooling button.

References Cited by the Examiner

UNITED STATES PATENTS

| | | | |
|---|---|---|---|
| 970,669 | 9/1910 | Vallone et al. | 10—155 |
| 1,272,634 | 7/1918 | Escobales | 29—208 |
| 1,897,116 | 2/1933 | Friedman | 10—162 |
| 2,183,600 | 12/1939 | Werner et al. | 10—155 |
| 2,370,201 | 2/1945 | Siesel. | |
| 2,487,129 | 11/1949 | Hallock | 10—85 |
| 2,613,374 | 10/1952 | Gora | 10—155 |
| 2,802,526 | 8/1957 | Hillman | 10—162 |
| 2,918,163 | 12/1959 | Willis | 198—33 |
| 2,927,333 | 3/1960 | Stern | 10—155 |
| 2,965,146 | 12/1960 | Cox | 10—155 |
| 3,024,523 | 3/1962 | Donaldson | 10—155 |
| 3,100,307 | 8/1963 | Hatherell et al. | 10—155 |
| 3,144,159 | 12/1963 | Yoshikawa | 10—155 |

ANDREW R. JUHASZ, *Primary Examiner.*